United States Patent [19]
Nishino et al.

[11] Patent Number: 5,698,956
[45] Date of Patent: Dec. 16, 1997

[54] CONTROL SYSTEM FOR ELECTRICALLY OPERATED POWER STEERING APPARATUS

[75] Inventors: Kazuhisa Nishino; Hirohisa Awa, both of Kobe, Japan

[73] Assignee: Mitsubishi Denki Kabushiki Kaisha, Tokyo, Japan

[21] Appl. No.: 582,532

[22] Filed: Jan. 3, 1996

[30] Foreign Application Priority Data

Apr. 10, 1995 [JP] Japan .................. 7-084281

[51] Int. Cl.$^6$ ........................................ B62D 5/04
[52] U.S. Cl. ................ 318/432; 180/443; 364/424.051; 318/434
[58] Field of Search .................. 180/79.1, 140–141, 180/443–446; 364/424.05, 424.051–424.053; 318/432, 434

[56] References Cited

U.S. PATENT DOCUMENTS

| | | | |
|---|---|---|---|
| 4,800,975 | 1/1989 | Oshita et al. | 180/142 |
| 4,830,137 | 5/1989 | Tatemoto et al. | 180/71.1 |
| 4,979,114 | 12/1990 | Oshita et al. | 180/443 |
| 5,040,629 | 8/1991 | Matsuoka et al. | 180/79.1 |
| 5,201,818 | 4/1993 | Nishimoto | 180/79.1 |
| 5,404,960 | 4/1995 | Wada et al. | 180/79.1 |
| 5,469,357 | 11/1995 | Nishimoto | 364/424.05 |
| 5,480,000 | 1/1996 | Daido et al. | 180/79.1 |
| 5,504,679 | 4/1996 | Wada et al. | 364/424.05 |
| 5,507,359 | 4/1996 | Wada | 180/79.1 |

FOREIGN PATENT DOCUMENTS

| | | |
|---|---|---|
| 39 17 053 A1 | 12/1989 | Germany. |
| 62-34856 | 2/1987 | Japan. |

Primary Examiner—David S. Martin
Attorney, Agent, or Firm—Sughrue, Mion, Zinn, Macpeak & Seas, PLLC

[57] ABSTRACT

A control system for an electrically operated power steering apparatus which is capable of eliminating an incongruous steering sensation and improving the converging performance of a steering wheel. The control system comprises a steering torque detecting unit 20 for detecting a steering torque applied to a steering system, a motor 10 coupled to the steering system, and a control unit for controlling the motor 10 using an output of the steering torque detecting unit 20 phase-compensated on the basis of a speed of the motor 10. The control unit includes a target current determining section 25 for determining a target current to the motor 10 on the basis of the output of the steering torque detecting unit 20 and a phase compensating section 21 for obtaining a phase compensation value on the basis of the output of the steering torque detecting unit 20 and the speed of the motor 10. The target current is corrected by the phase compensation value.

9 Claims, 14 Drawing Sheets

CONTROL SYSTEM FOR ELECTRICALLY OPERATED POWER STEERING APPARATUS

BACKGROUND OF THE INVENTION

1. Field of the Invention

The present invention relates to a control system for controlling a motor on the basis of an input signal value compensated in phase, and more particularly to a control system for control of a motor of an electrically operated power steering apparatus which serves to assist, with a power, a driver in steering a motor vehicle.

2. Description of the Prior Art

As one example of a conventional system which controls a motor on the basis of a phase-compensated input signal, there has been known a control system for an electrically operated power steering apparatus which supplies a power to support a manually operated steering of a motor vehicle such as an automobile. Such an electrically operated power steering control system will be described hereinbelow with reference to FIG. 16. In FIG. 16, designated at reference numeral 1 is a steering wheel which produces a steering rotational force by a car driver and which takes a coupled relation to one end of a first steering shaft 2a. To the first steering shaft 2a, there is attached a torque sensor 9 for detecting a rotational force (steering torque) applied to the steering wheel 1 to produce an electric signal corresponding to the detected rotational force. The other end of the first steering shaft 2a is coupled through a universal joint 3a to one end of a second steering shaft 2b, the other end of which is coupled through a universal joint 3b to a pinion shaft 4. The pinion shaft 4 is in an engaged relation to a rack tooth portions 5a on a rack shaft 5. Both ends of the rack shaft 5 are respectively connected through ball joints 6a, 6b to a pair of tie rods 7a, 7b which in turn, are coupled to a rotary shaft for wheels.

The first steering shaft 2a is connected with a motor 10 with a reduction mechanism 8 comprising first and second gears 8a, 8b being interposed therebetween, the larger-diameter first gear 8a being connected with the first steering shaft 2a below the torque sensor 9, while the smaller-diameter second gear 8b is connected through a clutch 11 to a rotary shaft of the motor 10.

In the same illustration, denoted at reference numeral 12 is a control unit for the electrically operated power steering apparatus, which controls the output of the motor 10 and the connection and disconnection of the clutch 11 on the basis of the electric signal from the torque sensor 9. The output of the motor 10 is transferred through the clutch 11 to the second gear 8b of the reduction mechanism 8, thus facilitating the steering action due to the steering wheel 1. In addition, the clutch 11, controlled with the control unit 12, establishes the connection and disconnection between the motor 10 and the second gear 8b of the reduction mechanism 8.

Moreover, for such an electrically operated power steering control system, as exemplified by description in documents such as Japanese Published Examined Patent Application No. 4-72749 and Japanese Published Unexamined Patent Application No. 62-255269, there have been disclosed means for compensating for the inertia of the motor 10 or the response delay of a transfer mechanism including the reduction mechanism 9 and so on as a function of a differential output of the torque sensor 9.

However, such a prior art technique has suffered from a problem associated with the torque sensor 9. More specifically, in a general way the torque sensor 9 is designed to detect the rotational force (torque) on the basis of the torsion of its spring, in other words the steering wheel 1 is placed on the spring of the torque sensor 9 and the motor 10 is located below the spring, by which construction, adverse effects can show when the inertia of the motor 10 is compensated on the basis of only the differential output of the torque sensor 9. For example, the inertia of the steering wheel 1 above the torque sensor 9 increases with the steering speed (rotational speed) of the steering wheel 1 and the overshoot amount of the steering wheel 1 grows. Depending upon the steering speed of the steering wheel 1, the gain of the differential output of the torque sensor 9 increases, besides the inertia of the steering wheel 1 increases to make the steering wheel 1 come into an unstable condition, thus sometimes causing anxiety to the vehicle driver.

In addition, the increase in the gain of the differential output of the torque sensor 9 can raise the inertia force of the steering wheel 1, with the result that, in the case of quick handling or rotation of the steering wheel 1, the reaction or resistance from the steering wheel 1 is extremely weak so that the response of the steering wheel 1 can feel low.

Further, when the steering wheel 1 is released from the driver's hands (manual operation) to turn from a fixedly held state into a free condition, the steering wheel 1 rotates to return to its neutral position by the help of the self-aligning torque and, hence, the differential output of the torque sensor 9 is produced in the direction that the steering wheel 1 is returned to the neutral position. The assistant force of the motor 10, controllable in accordance with the differential output, is generated in the direction that facilitate the rotation of the steering wheel 1, with the result that the inertia force of the steering wheel 1 increases due to the assistance of the motor 10 on the differential output of the torque sensor 9. Accordingly, the return speed of the steering wheel 1 increases so that the steering wheel 1 develops a large amount of overshoot from its neutral position, which prevents a smooth and quick convergence (returning to the neutral position) of the steering wheel 1.

SUMMARY OF THE INVENTION

The present invention has been developed with a view to removing the above-mentioned drawbacks, and it is therefore an object of the present invention to a control system for an electrically operated power steering apparatus which is capable of eliminating an incongruous steering sensation due to a steering speed of the steering wheel concurrent with improving the converging performance of the steering wheel.

In accordance with the present invention, a control system for an electrically operated power steering apparatus comprises steering torque detecting means for detecting a steering torque applied to a steering system, a motor coupled to the steering system, and control means for controlling the motor on the basis of a value obtained by phase-compensating for an output of the steering torque detecting means with a speed (rotational speed) of the motor.

When the speed of the motor is slow, the steering wheel is in a slowly rotated condition, in a fixedly held condition, or in a non-held, non-rotated condition resulting from the self-aligning torque or the like. In this instance, the phase compensation value is large during the phase compensating process for the steering torque, and hence the correction of the motor output based on the differential component of the steering torque can ease the returning and advancing handling of the steering wheel to ensure a smooth steering operation of the steering wheel.

In a preferred form of the invention, the control means is composed of target current determining means for determining a target current to be supplied to the motor on the basis of the output of the steering torque detecting means, and of phase compensating means for obtaining the phase compensation value on the basis of the output of the steering torque detecting means and the speed of the motor, the target current being corrected in accordance with the phase compensation value.

In a state in which the motor speed is high, the steering wheel is in a quickly rotated state or in a state returning to its center (neutral) position by means of the self-aligning torque because of being released from the driver's hands while travelling. In these instances, the phase compensation value is small during the phase compensating process for the steering torque so that the correction value for the motor output on the differential component of the steering torque approaches zero. For this reason, when the steering wheel takes the returning state because of releasing of the steering wheel, even if the torque differential output arises in the steering wheel advancing direction due to the inertia of the steering wheel, the correction amount of the motor output is small, with the result that the converging performance of the steering wheel improves without excessive assistance. In addition, since the phase compensation value for the steering torque is designed to be variable in accordance with the speed of the motor, a smooth converging motion of the steering wheel is possible.

In another preferred form of the invention, the phase compensating means is made up of phase compensation calculating means for calculating the phase compensation value as a function of a variation of the output of the steering torque detecting means and a predetermined coefficient or factor, and of gain multiplication means for determining a torque compensation output by multiplying a gain depending upon the motor speed by the phase compensation value.

When the motor speed is high, the differential gain becomes small during the phase compensating process for the steering torque, with the result that the correction value for the motor output on the differential component of the steering torque approaches zero. For this reason, even if the torque differential output issues in the steering wheel advancing direction due to the inertia of the steering wheel while the steering wheel is in a returning condition due to the release from the manual operation, the correction amount for the motor output is little, whereby the converging performance of the steering wheel improves without excessive assistance. In addition, since the differential gain of the steering torque is made to be variable in accordance with the motor speed, a smooth converging operation of the steering wheel is possible. Moreover, even if the steering wheel is quickly returned, since the differential gain of the steering torque varies in accordance with the steering speed of the steering wheel, the steering wheel is not subject to its instability creating a sense of incongruity.

In a further preferred form of the invention, the control means is additionally provided with phase compensation output limiting means for limiting the output of the phase compensating means in accordance with the motor speed.

With the provision of this means, when the motor speed is slow, the limit on the differential output of the steering torque is set to be small in order to perform the correction of the motor output so that the differential output of the steering torque is sufficiently effective, with the result that the returning and advancing operations of the steering wheel becomes easy to ensure a smooth steering of the steering wheel. On the other hand, when the motor speed is high, the limit on the differential output of the steering torque is set to be large so that the correction value for the motor output based on the differential output of the steering torque reaches zero or approaches zero. accordingly, in a state where the steering wheel is in a returning condition due to the release from the manual handling, even if the torque differential output issues in the steering wheel advancing direction due to the inertia of the steering wheel, limitation is imposed on the correction amount for the motor output arising out of the differential output, with the result that the converging performance of the steering wheel improves without excessive assistance. Moreover, the limit imposed on the differential output of the steering torque is made to be variable in accordance with the motor speed, whereby a smooth converging operation of the steering wheel is possible. Still further, even if the steering wheel comes into a quickly returning condition, the limit on the differential output of the steering torque varies in accordance with the steering speed of the steering wheel, which can eliminate its instability creating a sense of incongruity.

In a further preferred form of the invention, the phase compensating means comprises phase compensation calculating means for phase-compensating for the output of the steering torque detecting means as a function of an operation coefficient, while the phase compensating means determines the operation coefficient on the basis of the motor speed.

This arrangement can contribute a good steering sensation regardless of the frequency of the steering torque. Resulting from disturbances developed, for example, when the motor vehicle runs over a small stone or wheel track, limited or fine torque oscillation due to high-frequency components of the steering torque input frequency is removable. In addition, in terms of the low-frequency components of the steering torque input frequency generated due to the torque variation caused by the steering of the steering wheel, the operation coefficient for the phase compensation is determined on the basis of the motor speed so that the phase compensation gain becomes smaller as the motor speed increases, and hence, while the steering wheel is in no rotating state, the phase compensation gain represents a large value, with the result that the returning and advancing operations of the steering wheel become easy, thus allowing a smooth steering handling of the steering wheel. Furthermore, if the frequency characteristic is set so that the gain represents a small value when the steering wheel is in a rotating condition, it is possible to suppress an excessive assistance arising from an excessive rise of the phase compensation gain and further to avoid instability of the steering wheel. Moreover, since the frequency characteristic can be changed in accordance with the steering speed of the steering wheel even if the steering wheel is in a released and returned condition, the gain becomes small when the steering wheel rotates at a high speed. Accordingly, it is possible to suppress the excessive assistance from the torque variations at the time of the release of the steering wheel, by which suppression the overshoot amount relative to the neutral position of the steering wheel decreases, with improved converging performance of the steering wheel. As a result of these effects, it is possible to eliminate the instability of the steering wheel and hence to offer a safety and a comfortable steering sensation.

In a further preferred form of the invention, limitation is imposed on the limiting value for the phase compensation gain or phase compensation output. Accordingly, this can prevent torque oscillation caused by the lowering of the phase compensation gain or phase compensation output and can avoid an unstable feeling of the steering wheel due to excessive increase in the gain.

In a further preferred form of the invention, a hysteresis is given to the limit on the phase compensation gain or phase compensation output. Accordingly, this allows preventing the oscillation of the gain or limiting value arising from the disturbances such as the detection error in the motor speed.

In a further preferred form of the invention, the control system is additionally equipped with speed maintaining means for keeping a maximum value of the motor speeds when the motor speed exceeds a first decision value, and further with clearing means for clearing the maintained value of the motor speed when the motor speed is below a second decision value smaller than the first decision value or when the polarity of the speed turns, the control being made on the basis of the maintained value.

Since the maximum value of the motor speed is maintained and used for the control, it is possible to prevent vibration or oscillation of the gain and limiting value coming from the detection timing or detection errors of the motor speed. In addition, the maximum value of the motor speed is always reset when the motor speed is below the first decision value, while maintained when it exceeds the first decision value, and the maintenance of the maximum value continues until the motor speed goes below the second decision value or until the polarity of the motor speed comes into inversion. Whereupon, without depending upon the detection timing and detection error of the motor speed, the suitable gain corresponding to the steering speed of the steering wheel is obtainable on the basis of the maintained maximum value of the motor speed and usable for the control. Moreover, if a certain motor speed value, which allows the decision of the fact that the steering wheel is in the released and returning condition, is determined as the first decision value, the converging performance of the steering wheel can improve at the time of the steering wheel being in the released and returning condition.

In a further preferred form of the invention, the phase compensation gain includes a negative value.

In this instance, in control a current flowing in a direction opposite to the steering wheel rotating direction works on the motor when the steering speed of the steering wheel assumes a high value. Whereupon, the motor serves as a load to reduce the overshoot amount at the time of the steering wheel being in the released and returning condition, with improved converging performance of the steering wheel. In addition, with the gain being set to a negative value, the motor speed lowers fast so that the gain returns to a positive value, thus resulting in elimination of the incongruous steering feeling.

In a still further preferred form of the invention, the target current determining means corrects the target current to the motor determined as a function of the output of the steering torque detecting means, so that it decreases in accordance with the motor speed.

Accordingly, when the motor speed is high, for example, where the steering wheel is in the released and returning state, the motor output can be lowered so that the motor serves as a load, which can grade up the converging ability of the steering wheel. Moreover, even if the steering wheel undergoes a quick handling, the assistant force decreases to provide a good responsive sensation. Furthermore, if further limiting the gain or differential output of the phase compensating section, it is possible to offer not only a more desirable steering wheel returning motion, but also more excellent converging performance, and even a better steering feeling.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 16:
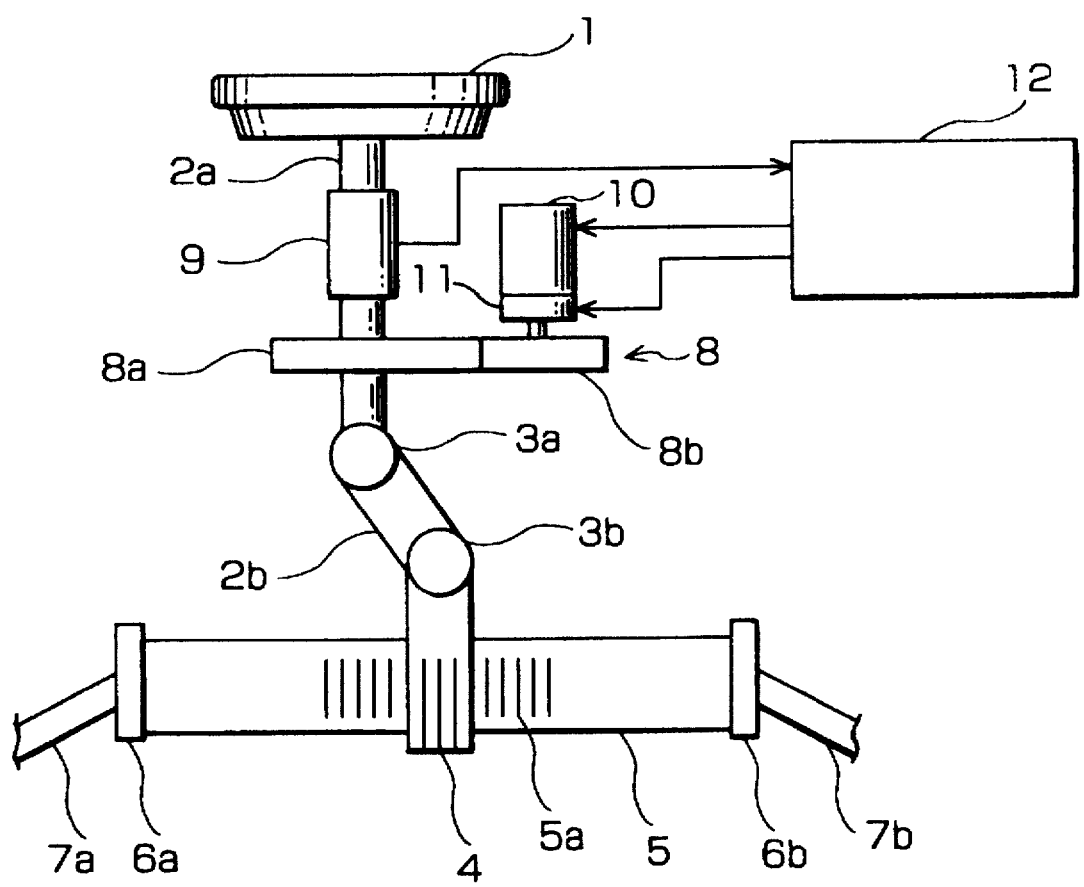
FIG. 16 is an illustration for schematically describing an arrangement of a prior art electrically operated power steering apparatus.

A description will be made hereinbelow of preferred embodiments of the present invention with reference to the accompanying drawings. In the embodiments, the present invention is applied to an electrically operated power steering apparatus as shown in FIG. 16.

First Embodiment

Figure 1:
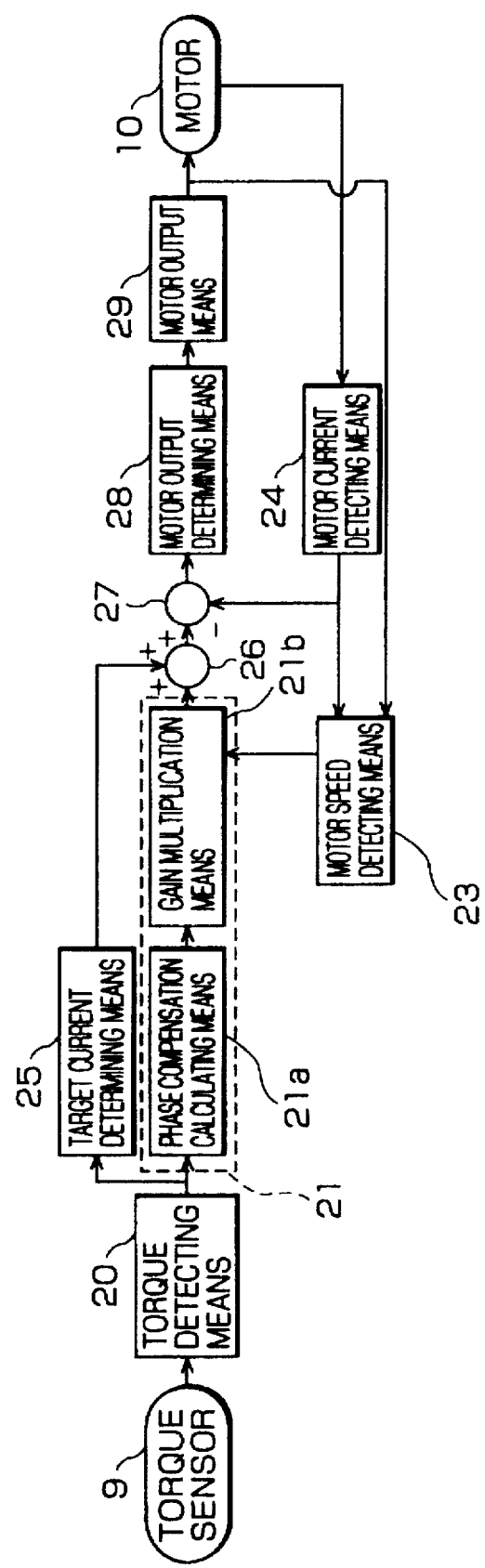
FIG. 1 is a block diagram showing an arrangement of a control system for an electrically operated power steering apparatus according to a first embodiment of the present invention.
Figure 2:
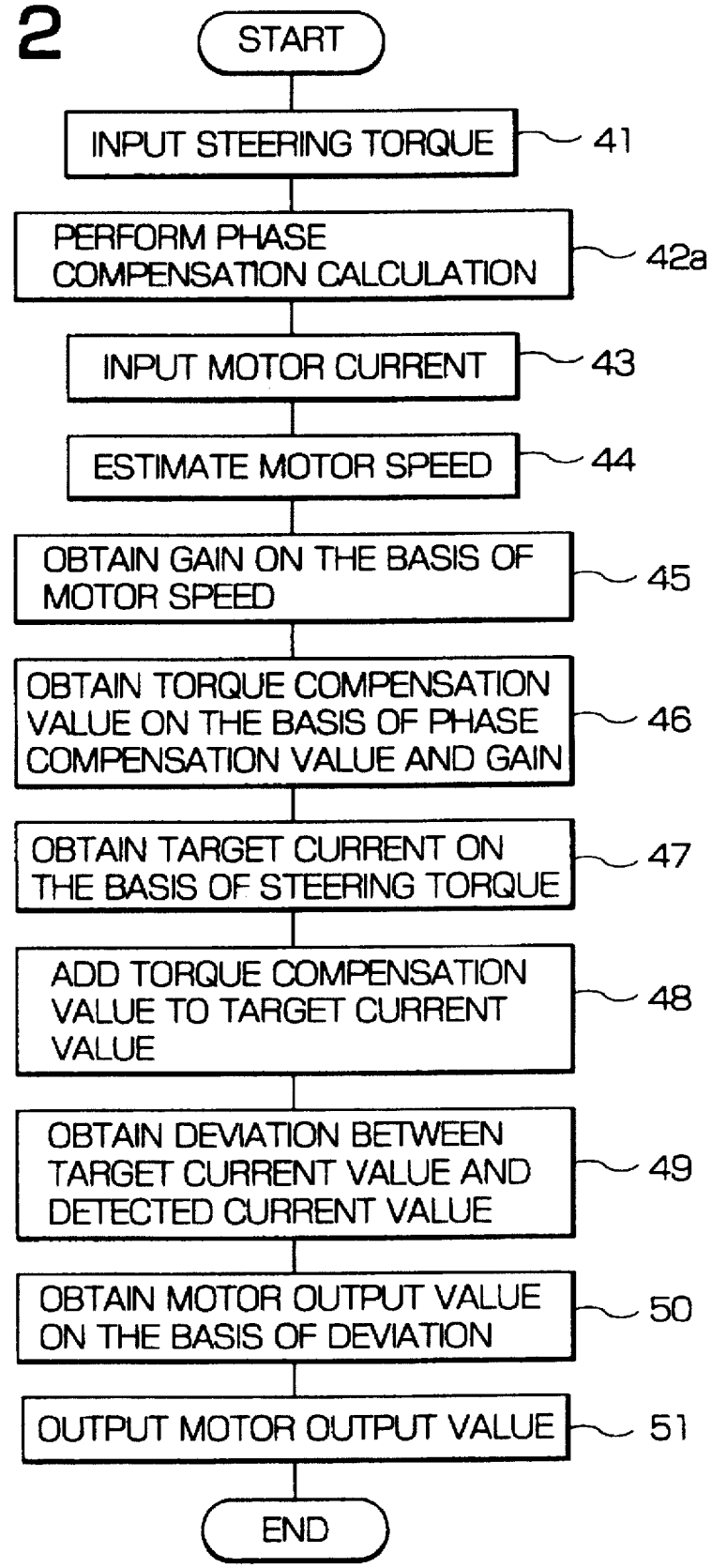
FIG. 2 is a flow chart available for describing the operation of the control system according to the first embodiment.
Figure 3:
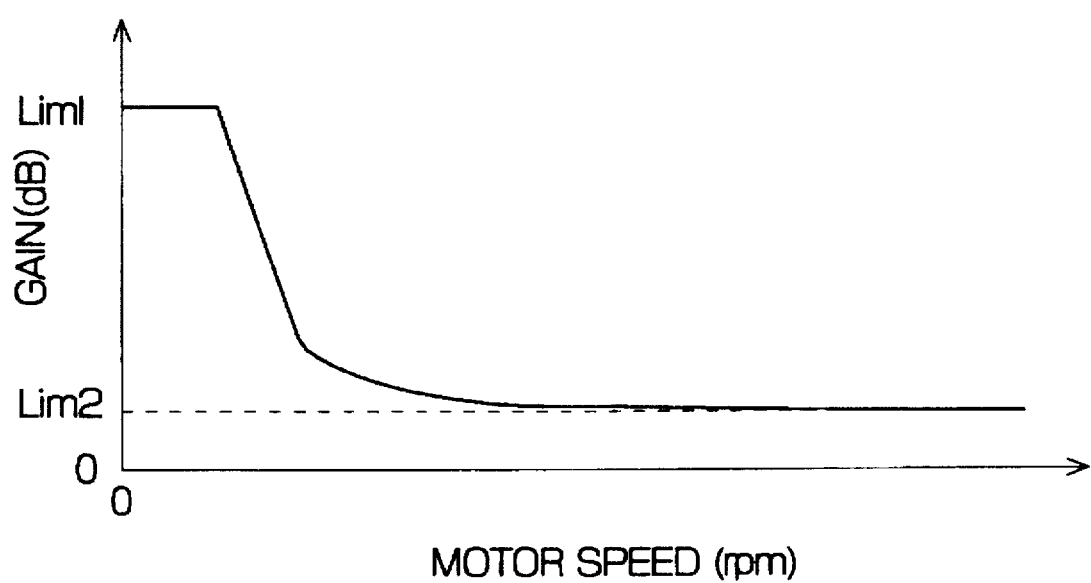
FIG. 3 is a graphic view showing the relationship between a speed of a motor and a gain in the first embodiment.

First of all, a description will begin with a control system for an electrically operated power steering apparatus according to a first embodiment of this invention in conjunction with the block diagram of FIG. 1, the flow chart of FIG. 2, and the characteristic-showing view of FIG. 3.

In FIG. 1 which schematically illustrates an arrangement of the control system according to the first embodiment, the control system is shown as comprising a torque sensor 9 for detecting a rotational force (steering torque) of a steering wheel 1 (see FIG. 16) of a motor vehicle to generate an electric signal corresponding to the detected steering torque, a torque detecting means 20 for receiving an output signal of the torque sensor 9, a phase compensating means 21 for compensating for the phase of an output signal of the torque detecting means 20, a motor speed detecting means 23 for detecting the speed of a motor 10 to output a signal corresponding to the detected speed toward the phase compensating means 21, and a motor current detecting means 24 for detecting a current supplied to the motor 10. Also included in the control system are a target current determining means 25 for determining a target value of a current to the motor 10 on the basis of the output of the torque detecting means 20, a motor output determining means 28 for determining an output of the motor 10 on the basis of the output of the phase compensating means 21, the output of the motor current detecting means 24 and the output of the target current determining means 25, and a motor output means 29 for supplying the motor 10 with a current in accordance motor output of the motor output determining means 28. The phase compensating means 21 is made up of a phase compensation calculating means 21a and a gain multiplication means 21b which will be described later.

The torque detecting means 20 is responsive to an output signal of the torque sensor 9 so as to supply a corresponding torque signal to both the target current determining means 25 and phase compensation calculating means 21a of the phase compensating means 21. The target current determining means 25 determines a target current instruction value in accordance with the torque signal, while the phase compensation calculating means 21a of the phase compensating means 21 calculates a phase compensation value using a variation of the torque signal and a predetermined coefficient and issues the calculation result to the gain multiplication means 21b in the same phase compensating means 21. The gain multiplication means 21b determines a torque compensation output by multiplying the aforesaid phase compensation value by a gain. The gain, used for the multiplication process in the gain multiplication means 21b, is determined on the basis of the motor speed detected in the motor speed detecting means 23 as shown in FIG. 3. In addition, the motor current detecting means 24 senses a current flowing into the motor 10.

FIG. 3 is an illustration (map) of a characteristic available in determining a gain in accordance with the motor speed. As shown in FIG. 3, in this embodiment the gain represents a smaller value as the motor speed increases, where the upper and lower limits on the gain are set to lim1 and lim2, respectively. With the upper and lower limits giving with respect to the gain, prevention is possible in terms of the instability of the steering wheel arising from an excessive increase in the gain and the generation of torque oscillation resulting from an excessive gain decrease.

Secondly, an addition section 26 adds a target current instruction value determined in the target current determining means 25 to a torque compensation value obtained in the phase compensating means 21, thereupon a subtraction section 27 calculates a deviation between this addition value and a motor current value detected in the motor current detecting means 24 and supplies the calculated deviation to the motor output determining means 28. The motor output determining means 28 obtains a motor output value as a function of this deviation and then outputs it to the motor output means 29. Subsequently, the motor output means 29 supplies the motor 10 with a current corresponding to the obtained motor output value. The motor speed detecting means 23 receives the output value of the motor output means 29 and the motor current detection value of the motor current detecting means 24, where a motor speed is estimated on the basis of a motor output value (the output of the motor output means 29) and a real motor current (the output of the motor current detecting means 24). In this invention, the control means is made up of the phase compensating means 21, the target current determining means 25, the addition section 26, the subtraction section 27 and so on.

The operation of the control system according to this embodiment will be described hereinbelow with reference to the FIG. 2 flow chart. For example, the electrically operated power steering apparatus repeatedly executes the processes of FIG. 2 at a constant time interval. In FIG. 2, this operation begins with a step 41 to obtain as an input value a steering torque through the torque detecting means 20. This inputted torque value is stored in a memory of a microcomputer, not shown. Subsequently a step 42a is executed in order to calculate a phase compensation value as a function of a preset coefficient and a deviation of the present torque value from a steering torque value obtained and stored in the memory in the previous process of the step 41. Since as described above this operation is repeatedly carried out at a constant time interval, the steering torque deviation is equivalent to a variation of the torque per unit time. Accordingly, this process substantially results in a torque differential calculation process. Further, the operational flow advances to a step 43 to receive a motor current from the motor current detecting means 24, then followed by a step 44 to estimate a motor speed obtained in accordance with a predetermined function on the basis of that motor detection current and the output value of the motor output means 29 stored in the memory of the microcomputer. A step 45 follows to obtain a gain on the basis of the motor speed estimation value in accordance with the characteristic illustration (map) of FIG. 3. Incidentally, this gain can be calculated in accordance with a functional equation. After the completion of the step 45, the operational flow goes to a step 46 for a torque compensation value to be calculated by multiplication of the gain obtained in the step 45 by the phase compensation value obtained in the step 42a. This torque compensation value has positive and negative polarities in accordance with the varying directions of the steering torque. Meanwhile, a step 47 follows to obtain a target current value, to be supplied to the motor, on the basis of the steering torque inputted in the step 41. This target current value can also be given by a predetermined map or a given functional equation.

Thereafter, a step 48 is implemented to add the torque compensation value obtained in the step 46 to the target current value obtained in the step 47, then followed by a step 49 to obtain a deviation from the motor current value inputted in the step 43. Further, a step 50 follows to obtain from this deviation a motor output value to be outputted to the motor 10, and then a step 51 is implemented to supply the motor with a current corresponding to the motor output value. The motor output value outputted at this time is stored in the memory of the microcomputer. After the elapse of a predetermined time period, the operation again starts with the aforementioned step 41.

Thus, when the motor speed is slow, the gain in the phase compensating means 21 becomes large, with the result that the returning and advancing operations of the steering wheel 1 go light to ensure a smooth steering wheel handling. On the other hand, when the motor speed is high, the gain in the phase compensating means 21 becomes small, and hence the correction amount for the motor output is little even if a torque differential output issues due to the inertia of the steering wheel 1 in the steering wheel advancing direction, an excessive assistance does not take place so that the converging performance of the steering wheel 1 can improves. Moreover, since the gain in the phase compensating means 21 is made to be variable in accordance with the speed of the motor 10, a smooth convergence of the steering wheel 1 is possible. Furthermore, even if the steering wheel 1 undergoes a quick handling, the gain in the phase compensating means 21 varies in accordance with the steering speed of the steering wheel 1, which can cut an incongruous steering sensation.

Second Embodiment

Figure 4:
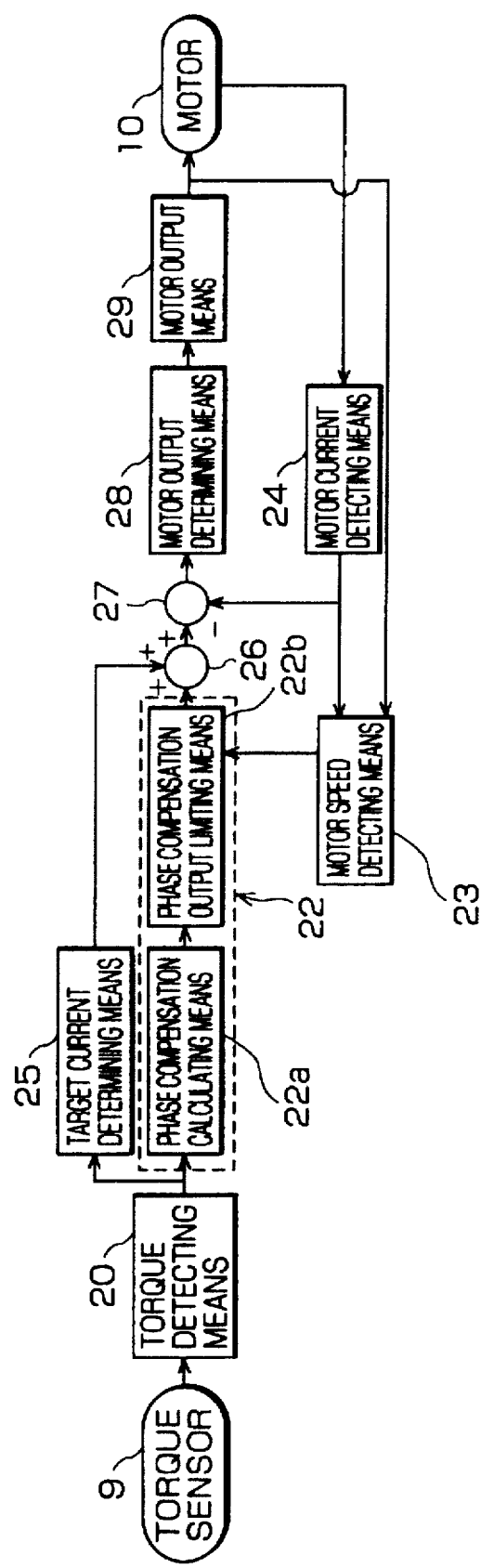
FIG. 4 is a block diagram showing an arrangement of a control system according to a second embodiment of this invention.
Figure 5:
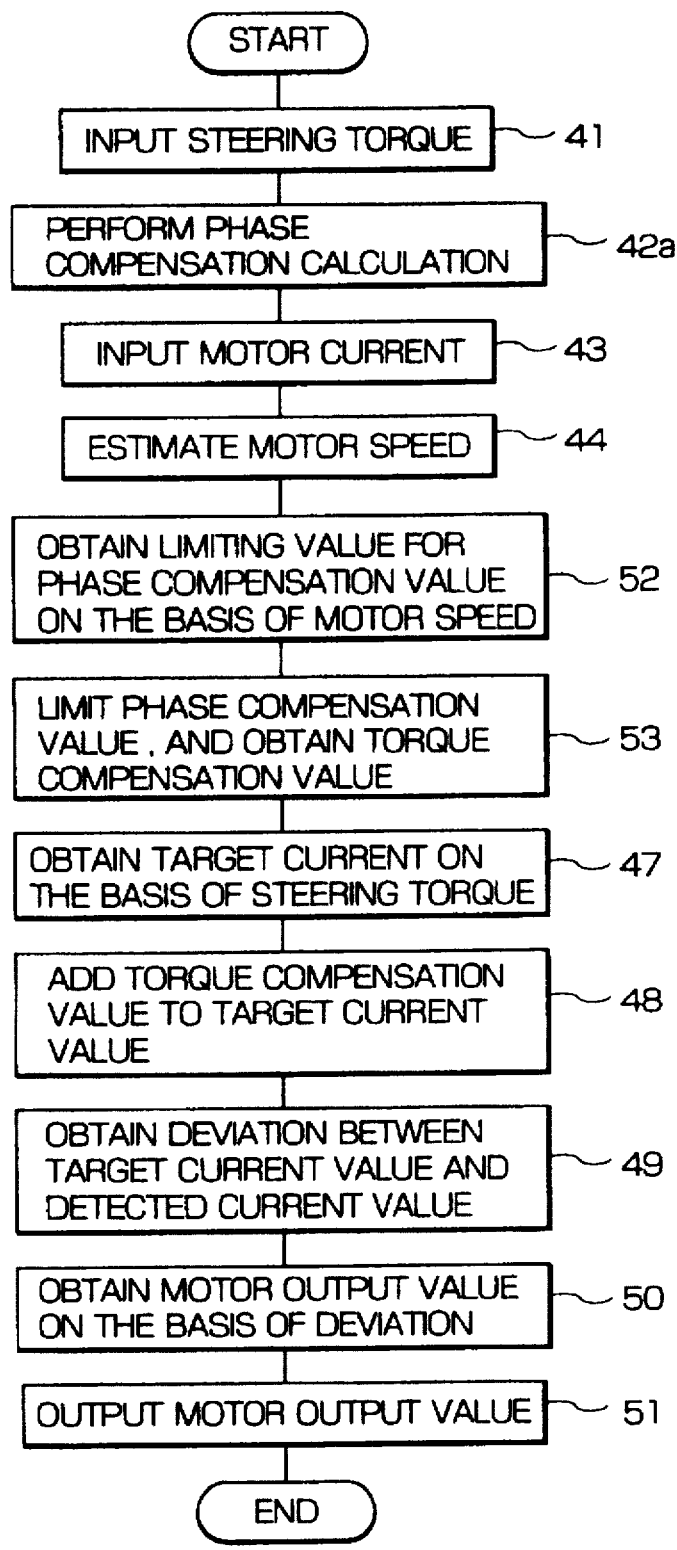
FIG. 5 is a flow chart useful for describing the operation of the control system according to the second embodiment.
Figure 6:
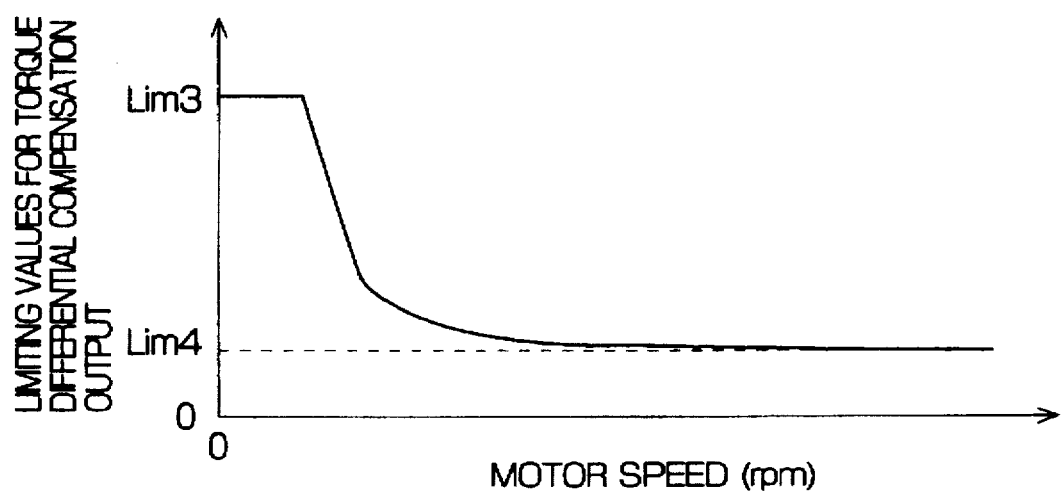
FIG. 6 is a graphic view showing the relationship between a speed of a motor and a limiting value for a phase compensation output in the second embodiment.

FIG. 4 is a block diagram showing a control system for an electrically operated power steering apparatus according to a second embodiment of the present invention, FIG. 5 is a flow chart showing the operation of the control system, and FIG. 6 is a characteristic illustration useful for describing the control system. In FIG. 4, blocks denoted at the same reference numerals as in FIG. 1 are identical in function to those in FIG. 1, and the description thereof will be omitted for brevity.

The difference of this embodiment from the FIG. 1 first embodiment relates to only an arrangement of a phase compensating means (22). More specifically, in this embodiment the phase compensating means 22 comprises a phase compensation calculating means 22a for calculating a phase compensation value using a variation of a torque signal and a predetermined coefficient, and further comprises a phase compensation output limiting means 22b for comparing the phase compensation output value from the phase compensation calculating means 22a with a given phase compensation output limiting value so as to limit the phase compensation output value to the given phase compensation output limiting value when the phase compensation output value exceeds the phase compensation output limiting value. The phase compensation output limiting value is determined in accordance with the motor speed detected in the motor speed detecting means 23, and shows a characteristic as shown in FIG. 6. FIG. 6 is a characteristic illustration (map) useful for determining a limiting value for a torque differential output in accordance with the motor speed. As shown in FIG. 6, the upper and lower limits on the torque differential output limiting value are set to be lim3 and lim4, respectively, whereby it is possible to prevent the unstable sensation of the steering wheel 1 arising from an excessive increase in the phase compensation output, coupled with the occurrence of the torque oscillation resulting from a surplus decrease in the phase compensation output.

A description will be made hereinbelow of its operation in conjunction with the flow chart of FIG. 5. In FIG. 5, processes designated at the same numerals are identical in operation to those in FIG. 2 and the description thereof will be omitted for simplicity.

A step 52 is implemented with a view to obtaining a phase output limiting value X on the basis of the motor speed estimated in the step 44 in accordance with the characteristic shown in FIG. 6. Subsequently, a step 53 follows to limit the phase compensation output value, obtained in the step 42a, to the limiting value X when the phase compensation output value is greater than the limiting value X. In this instance, as shown in FIG. 6 the limiting value for the phase compensation output represents a smaller value as the motor speed increases. In addition, this limiting value X is obtainable on the basis of a given function in which the motor speed is a variable.

Thus, when the motor speed is slow, the limitation on the output of a phase compensation calculating means 22a is relaxed to correct the motor output so that the phase compensation output for the steering torque is sufficiently effective, with the result that the returning and advancing operations of the steering wheel 1 becomes easy to make the steering wheel 1 smoothly operable. Going the other way, when the motor speed is high, the limitation is imposed severely on the output of the phase compensation calculating means 22a so that the motor output correction value based on the output of the phase compensation output calculating means 22a becomes close to zero. In consequence, even if the phase compensation output issues in the steering wheel advancing direction due to the inertia of the steering wheel 1 when the steering wheel 1 is in the returning condition (a high-speed rotating state) due to the release from the driver's hands, since a phase compensation output limiting means 22b limits the correction amount for the motor output, an excessive assistance does not take place but the converging performance of the steering wheel 1 can improve. Further, since the limit for the steering torque differential output varies in accordance with the speed of the motor 10, a smooth convergence of the steering wheel is possible. Moreover, even if the steering wheel 1 comes into a quickly handled state, since the limit for the steering torque differential output also varies in accordance with the steering speed of the steering wheel 1, there is no incongruous steering sensation at this time.

Third Embodiment

Figure 7:
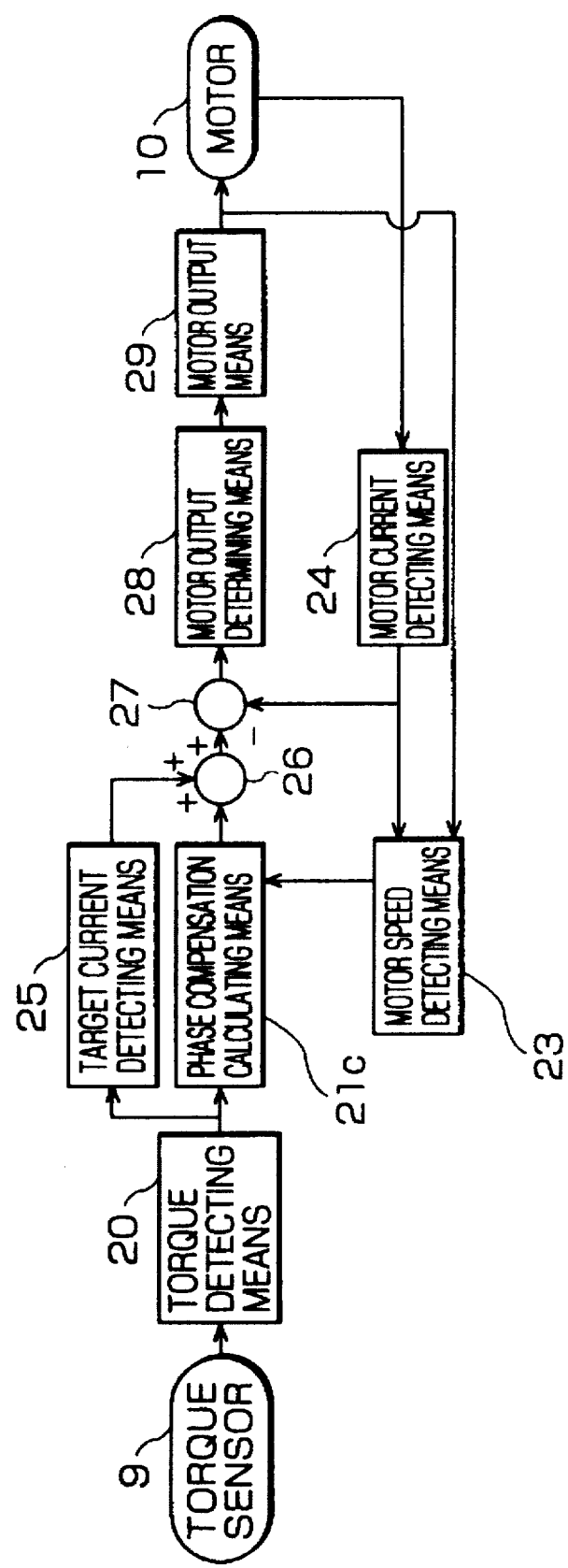
FIG. 7 is a block diagram showing an arrangement of a control system according to a third embodiment of this invention.
Figure 8:
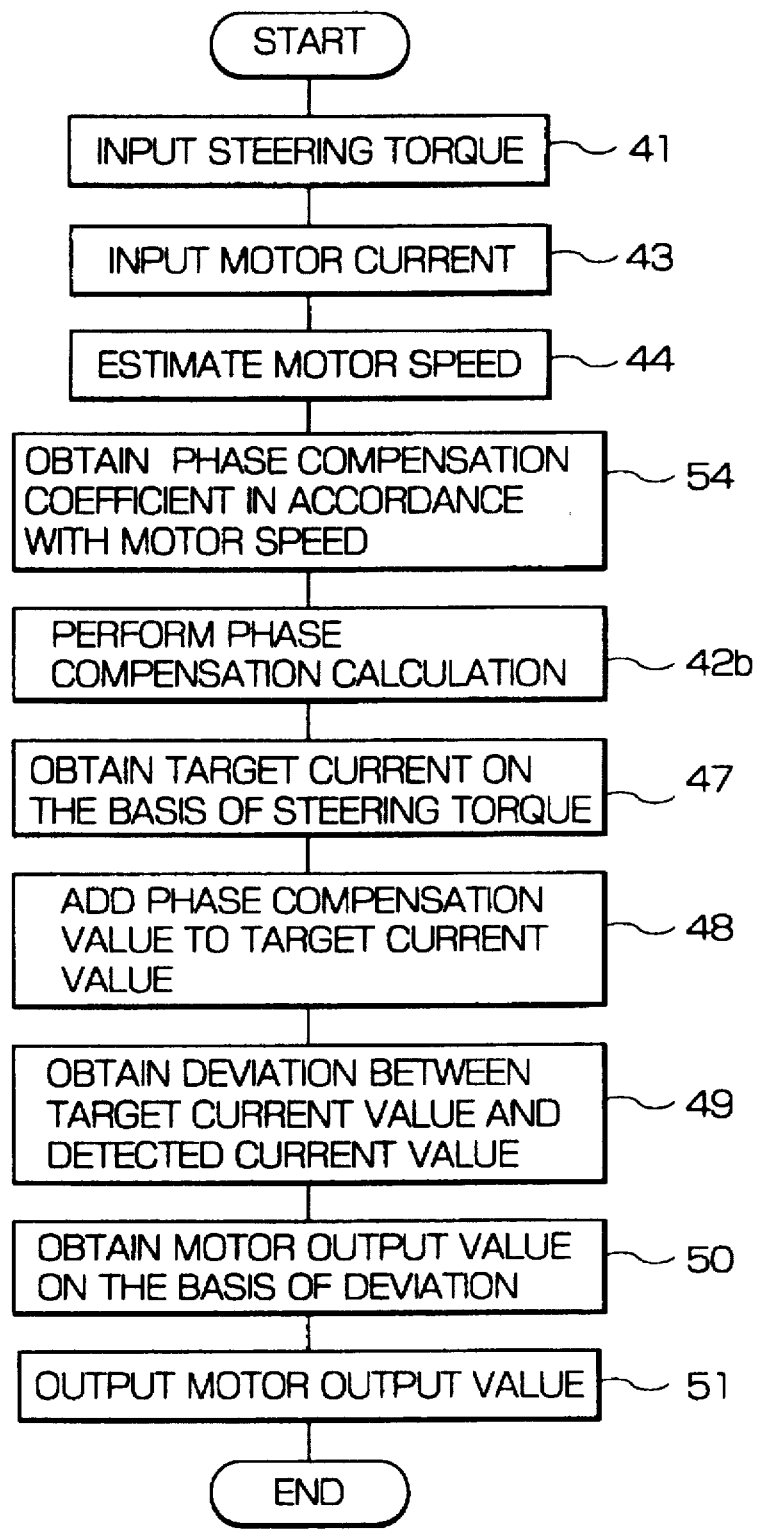
FIG. 8 is a flow chart useful for describing the operation of the control system according to the third embodiment.
Figure 9:
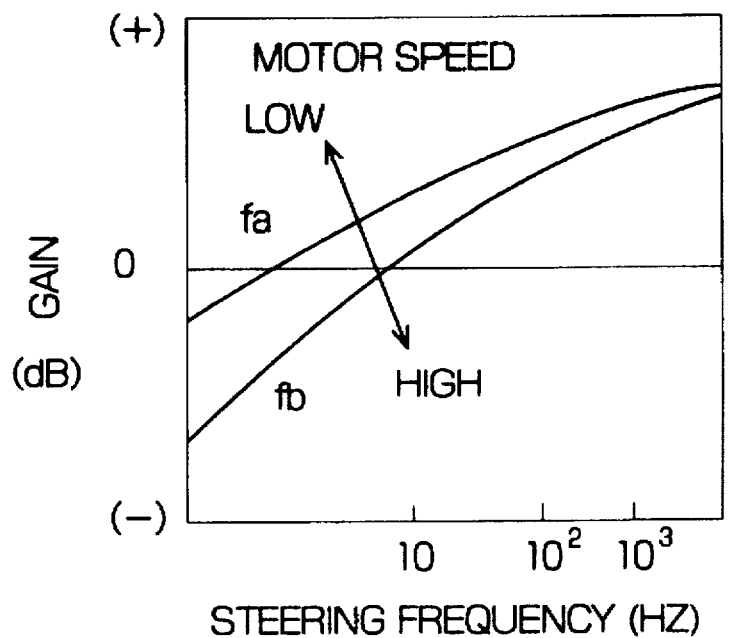
FIG. 9 is a graphic view showing the relationship among a speed of a motor, a gain and a frequency in the third embodiment.

FIG. 7 is a block diagram showing a control system for an electrically operated power steering apparatus according to a third embodiment of this invention, FIG. 8 is a flow chart showing the operation of the control system, and FIG. 9 is an characteristic illustration. In FIG. 7 blocks designated at like numerals are the same in operation as those in FIG. 1, and the description thereof will be omitted.

This embodiment is the same as the foregoing first embodiment except that the phase compensating means is responsive to the motor speed detected by the motor speed detecting means 23 so as to determine an operation coefficient on the basis of the detected motor speed. This operation coefficient corresponds to a phase-lead coefficient or a phase-lag coefficient. A phase compensation calculating means 21c performs the phase compensation calculation using this operation coefficient, and the output of the phase compensation calculating means 21c controls the motor output. Further, FIG. 9 shows the relationship (characteristic) between the steering torque frequency and the general lead phase of the gain in the phase compensating means. According to this characteristic, when the steering frequency (the frequency of the steering torque) is high, the gain generally takes a constant value regardless of whether the motor speed is high or low. In addition, the operation coefficient is made to vary in accordance with the motor speed and the frequency characteristic is set so that the gain in the low-frequency area lowers as the motor speed becomes higher.

A description will be made hereinbelow of its operation with reference to the flow chart of FIG. 8. In FIG. 8 the processes depicted at the same numerals as in FIG. 2 are identical in operation to those in FIG. 2, and the description thereof will come to omission.

A step 54 is executed in order to obtain a phase compensation coefficient on the basis of the motor speed estimated in the step 44, then followed by a step 42b to perform the phase compensation calculating operation using the obtained phase compensation coefficient. This phase compensation calculating operation relies on the following transfer function G(s).

$$G(s)=(s/\omega s)/(1+s/n\cdot \omega s)$$

where s depicts a derived function, ωs designates a steering torque frequency, and n denotes a gain, one of or both the n and ωs being obtained from the motor speed.

In terms of the gain n of this equation, when n>1, this equation means the phase-lead compensation, and when 0<n<1, it represents the phase-lag compensation. Further, the gain of the phase compensating means depends upon the value of n, which takes a maximum of 201 log(n) dB. In addition, in a case where the n is determined in accordance with the motor speed, the same effect as in the foregoing first embodiment shows. Moreover, the ωs serves as a factor to determine the characteristic for the gain of the phase compensating means and the steering torque.

Thus, when the motor speed is low, the frequency characteristic in the phase compensation calculating operation (step 42b) is set to, for example, a characteristic as indicated by a curve fa in FIG. 9 (the gain in a low steering frequency area at the time of a low motor speed is relatively large), and hence, owing to the correction of the motor output in the phase compensation calculating operation (step 42b), the returning and advancing handling can be made easily to satisfy a smooth steering wheel operation. On the other hand, when the motor speed is high, the phase compensation characteristic in the phase compensation calculating operation (step 42b) is set to, for example, a characteristic as indicated by a curve fb in FIG. 9 (the gain in the low steering frequency area at the time of a high motor speed is relatively small), with the result that, even if the phase compensation output arises in the steering wheel advancing direction due to the inertia of the steering wheel 1 when the steering wheel 1 is in a returning condition, the correction amount for the motor output is little. In addition, an excessive assistance does not take place but the convergence of the steering wheel 1 can improve. Further, a smooth convergence of the steering wheel 1 is possible, for that the phase compensation characteristic varies in accordance with the speed of the motor 10. Still further, even if the steering wheel 1 undergoes a quickly handling, the phase compensation coefficient varies in accordance with the steering speed (steering frequency) of the steering wheel 1, thus resulting in no incongruous steering sensation. Moreover, even if a high-frequency component is introduced into the steering torque due to a disturbance or the like, the torque high-frequency component is removable, which therefore makes it possible to suppress torque variations due to a high-frequency oscillation of the steering torque which can occur, for example, when the motor vehicle runs over a small stone or vehicle track.

In FIG. 9, fa and fb can be expressed as follows using the aforesaid transfer function.

$$fa=(s/\omega s1)/(1+s/n\cdot \omega s1)$$

$$fb=(s/\omega s2)/(1+s/n\cdot \omega s2)$$

The relationship between ωs1 and ωs2 is taken as ωs1<ωs2. Further, in the case that the value of the gain n is set to be large, the maximum value of the gain goes large, and when being set to be small, the maximum value of the gain becomes lower.

Fourth Embodiment

Figure 10:
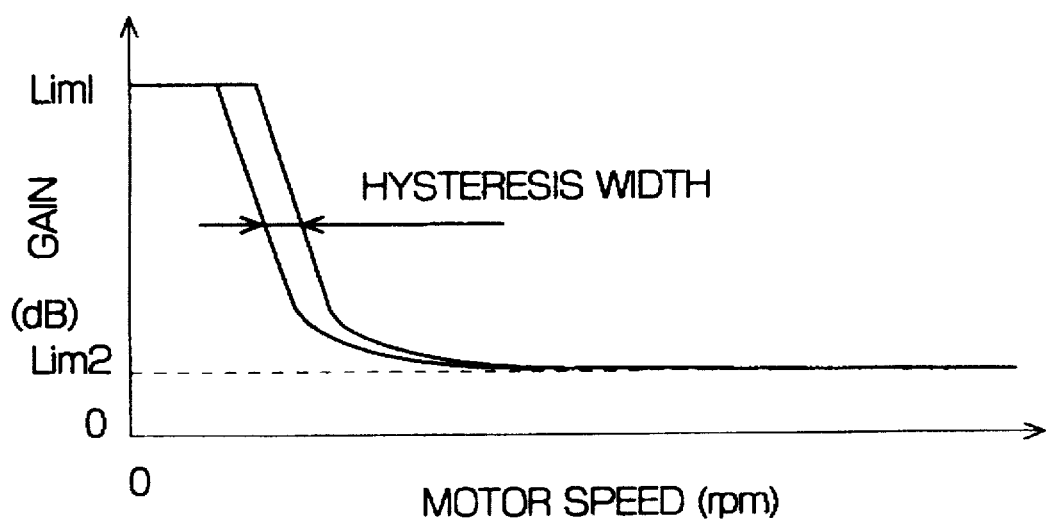
FIG. 10 is a graphic view showing the relationship among a speed of a motor, a gain and a hysteresis in a fourth embodiment of this invention.

FIG. 10 is a graphic illustration available for describing a fourth embodiment of this invention. A feature of this embodiment is that a hysteresis is given to the FIG. 3 gain characteristic determined through the gain multiplication means 21b of FIG. 1. This feature can control the influence on the gain even if the motor speed varies slightly by the detection errors of the estimation value of the motor speed or the like. In addition, it is also appropriate that in the same way a hysteresis is given to the FIG. 6 characteristic between the motor speed and the torque differential output limiting value obtained in the phase compensation calculating means 22a of the FIG. 4 second embodiment. In this case, the influence on the torque differential output limiting value is also controllable even if the motor speed varies slightly by the detection errors of the estimation value of the motor speed or the like.

Fifth Embodiment

Figure 11:
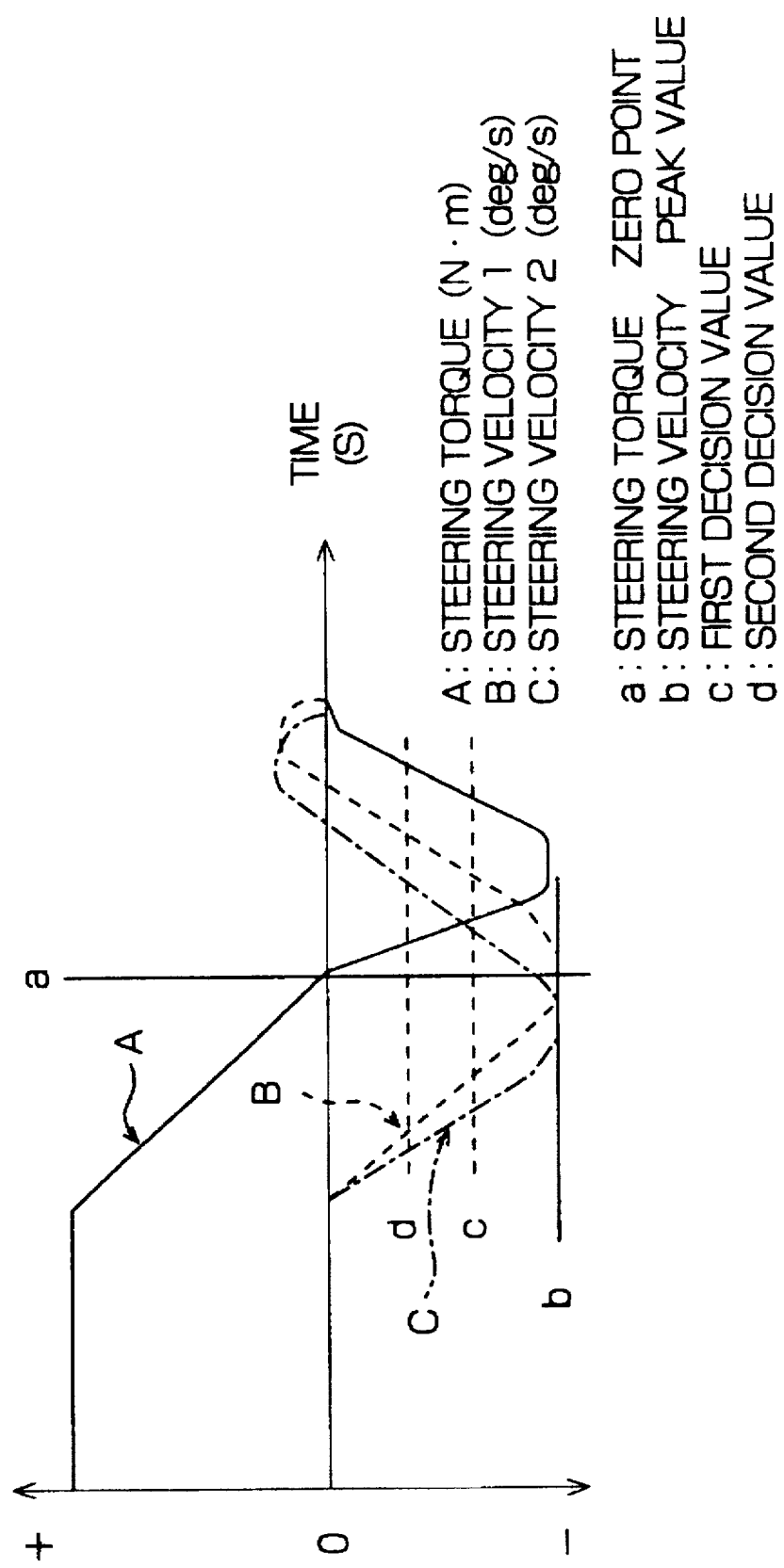
FIG. 11 is a graphic view showing the relationship between a steering speed and a steering torque at the time of a steering wheel being in a returning condition in a fifth embodiment of this invention.

Furthermore, a fifth embodiment of this invention will be described hereinbelow with reference to FIGS. 11 and 12. FIG. 11 is an illustration of the relationship between a steering torque and a steering speed for when the steering wheel is released from the handling in a state where the motor vehicle is travelling. As shown in FIG. 11, when the steering wheel 1 is in a held state, the steering torque and the steering speed substantially take a constant value. In addition, at this time, the steering torque is non-zero because the driver holds the steering wheel 1. If the driver releases the steering wheel 1 from this state, until the steering torque reaches zero, the steering torque issues by means of the self-aligning torque of the motor vehicle. After the steering torque passes through the zero point, a steering torque occurs due to the inertia force of a steering system such as the steering wheel 1 (characteristic A in FIG. 11 ). Further, when the driver releases the steering wheel 1, the steering wheel 1 rotates toward its neutral position by means of the self-aligning torque. This rotational speed becomes at a maximum when the steering torque is zero (characteristic B in FIG. 11 ). However, in the case that the steering speed of the steering wheel 1 is detected by an observer or the like, sometimes it does not become at a maximum due to the detection errors of the steering speed and the like irrespective of the steering torque being zero (for example, characteristic C in FIG. 11 ).

Figure 12:
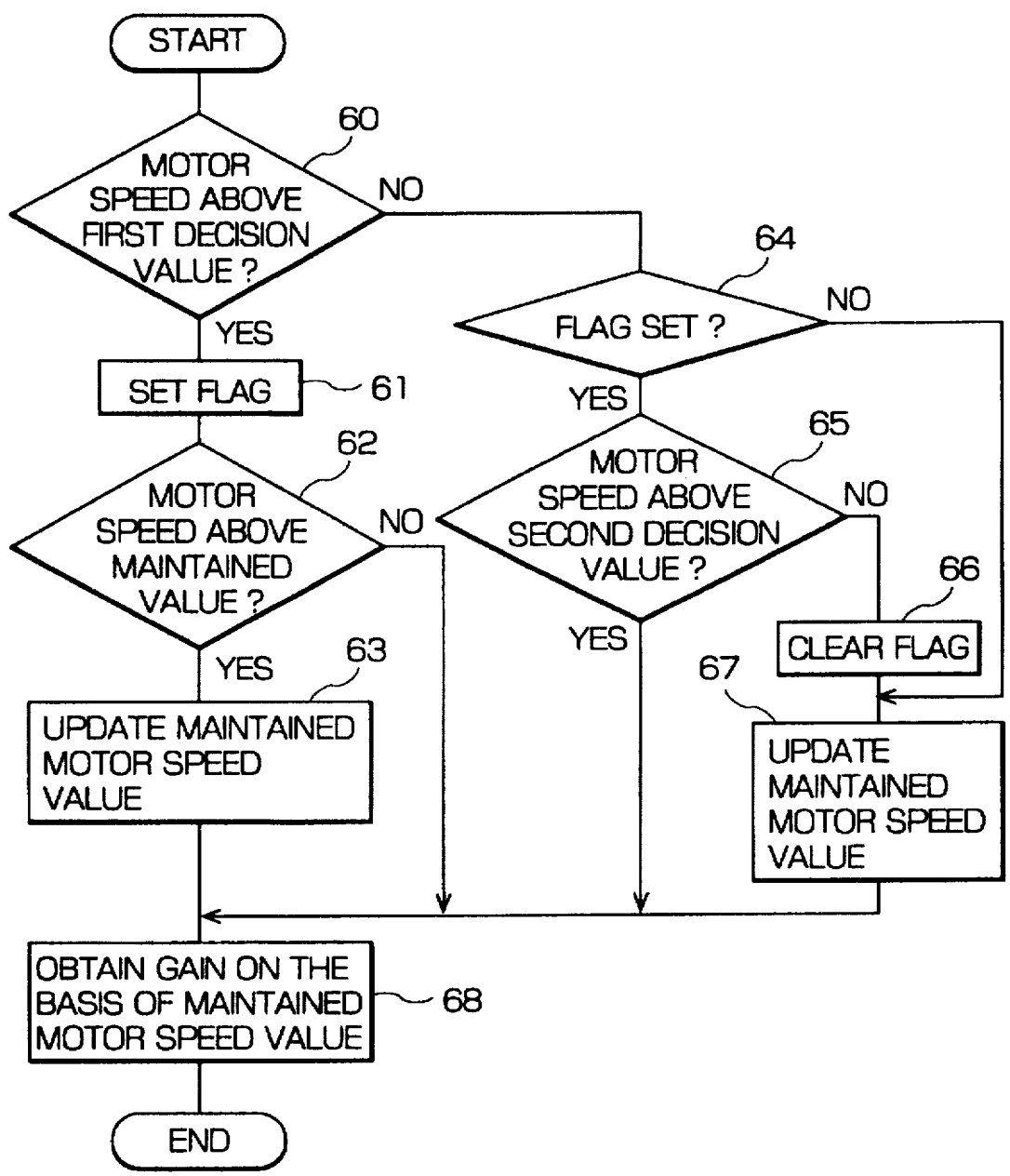
FIG. 12 is a flow chart available for explanation of the operation of a control system according to the fifth embodiment.

FIG. 12 is a flow chart showing one example of a method of determining the gain in accordance with the steering speed. The operation of the FIG. 12 flow chart is equivalent to the operation in which the gain is obtained on the basis of the motor speed in the gain multiplication means 21b of FIG. 1 or in the phase compensation calculating means 21c of FIG. 7. Accordingly, it is appropriate that the FIGS. 1 or 7 motor speed detecting means 23 includes a speed maintaining means for maintaining the maximum value of the motor speed when the motor speed is above the first decision value, and a clear means for clearing the maintained motor speed value when the motor speed is below the second decision value smaller than the first decision value or when the polarity of the motor speed turns. These means can also be provided independently of the motor speed detecting means 23.

A description will be made hereinbelow of the FIG. 12 operation. A step 60 is first executed to check to see if the absolute value of the motor speed is above a first decision value (a value c in FIG. 11 ). This first decision value serves as a decision standard (reference) for when the steering wheel is in the returning condition, and depends upon the steering wheel returning characteristic of the motor vehicle. In addition, the absolute value is used for the decision value.

When the motor speed exceeds the first decision value, a flag is set in a step 61. This flag is made to be set when the motor speed is above the first decision value and to be cleared when it becomes below a second decision value which will be described later. Furthermore, a step 62 is implemented in order to check whether or not the motor speed is above the maintained motor speed. If above the maintained value, a step 63 follows to update the maintained motor speed value.

On the other hand, if in the step 60 a decision is made such that the motor speed is below the first decision value, the operational flow goes to a step 64 to check whether or not the aforesaid flag is in the set state. If so, a step 65 is implemented to check to see if the motor speed is above a second decision value. When the motor speed is less than the second decision value, a step 66 follows to clear the flag, then followed by a step 67 to update the maintained motor speed value. On the other hand, when the answer of the step 64 is negative (the flag is not set), the step 67 is executed to update the maintained motor speed value. Further, a step 68 is implemented to obtain the gain on the basis of the maintained motor speed value. This operation allows the peak value to be maintained until the motor speed becomes below the second decision value after the motor speed is above the first decision value.

With the execution of this operation, for example, even if the steering speed (motor speed) at the point a (steering torque zero point) in FIG. 11 is not a peak value as shown by the characteristic C in FIG. 11, the peak value is maintained and hence the optimal gain is obtainable.

Sixth Embodiment

Figure 13:
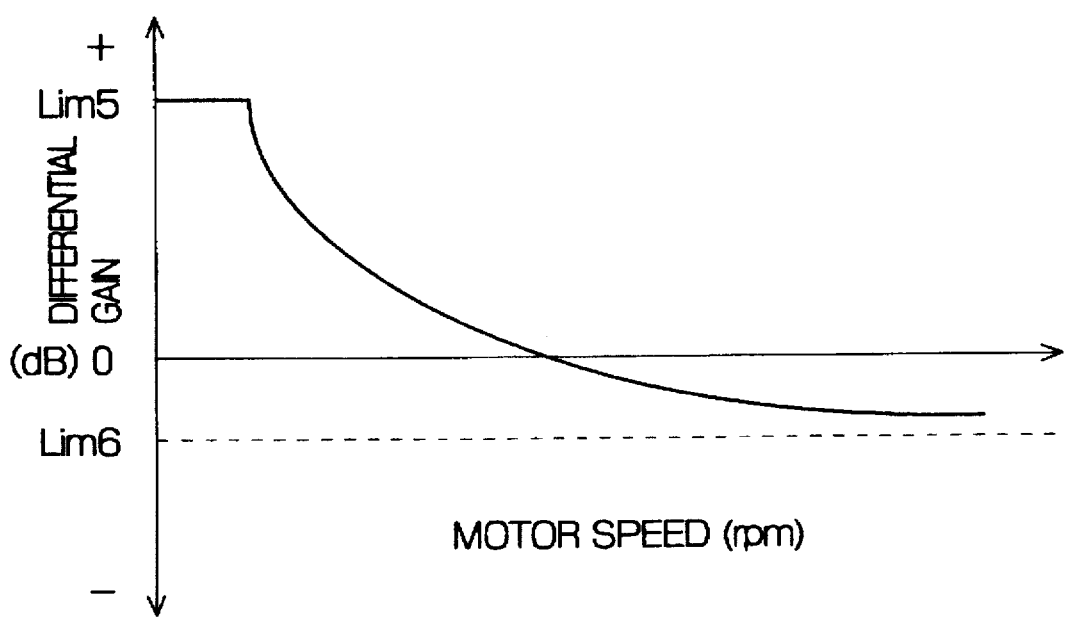
FIG. 13 is a graphic view showing the relationship between a speed of a motor and a gain in a sixth embodiment of this invention.

FIG. 13 is a graphic view illustrating the relationship between a motor speed and a gain in a sixth embodiment of this invention. As shown in FIG. 13, in this embodiment the phase compensation gain can take negative values, that is, the gain takes a negative value when the steering speed of the steering wheel 1 is high. Accordingly, the control is made such that the motor 10 is energized with a current flowing in a direction opposite to the rotating direction of the steering wheel 1. As a result, the motor 10 serves as a load so as to reduce the overshoot amount at the time of the steering wheel 1 being in a released state, with improved convergence. In addition, that the gain takes a negative value causes the motor speed to lower fast, and that the gain lowers (that is, motor speed lowers) allows the gain to return to a positive value, thus eliminating an incongruous steering sensation.

Moreover, in the FIG. 13 characteristic illustration, the upper and lower limits for the gain are set to lim5 and lim6, respectively. This can avoid the unstable sensation of the steering wheel 1 resulting from an excessive increase in the gain and the occurrence of a shock arising from an excessive decrease in the gain at the time of the steering operation of the steering wheel 1.

Seventh Embodiment

Figure 14:
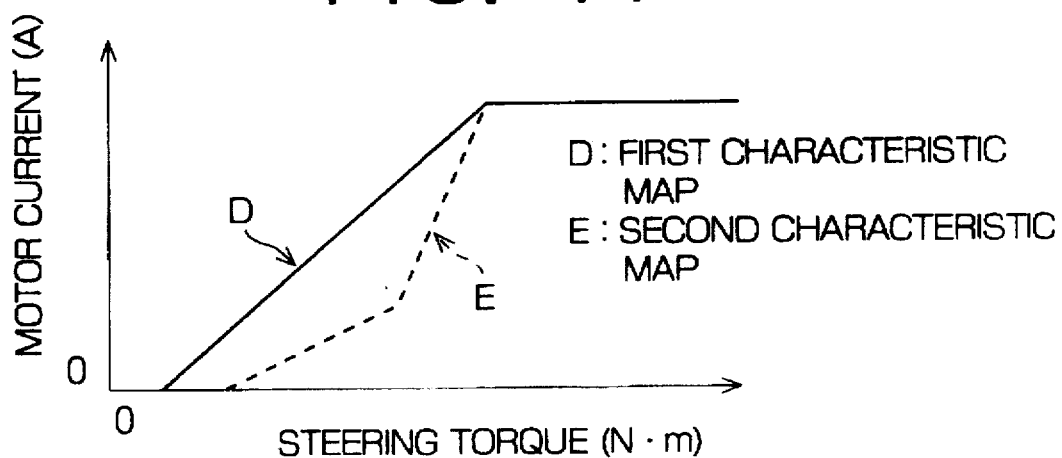
FIG. 14 is a graphic view showing the relationship among a steering torque, a motor current and a steering speed in a seventh embodiment of this invention.
Figure 15:
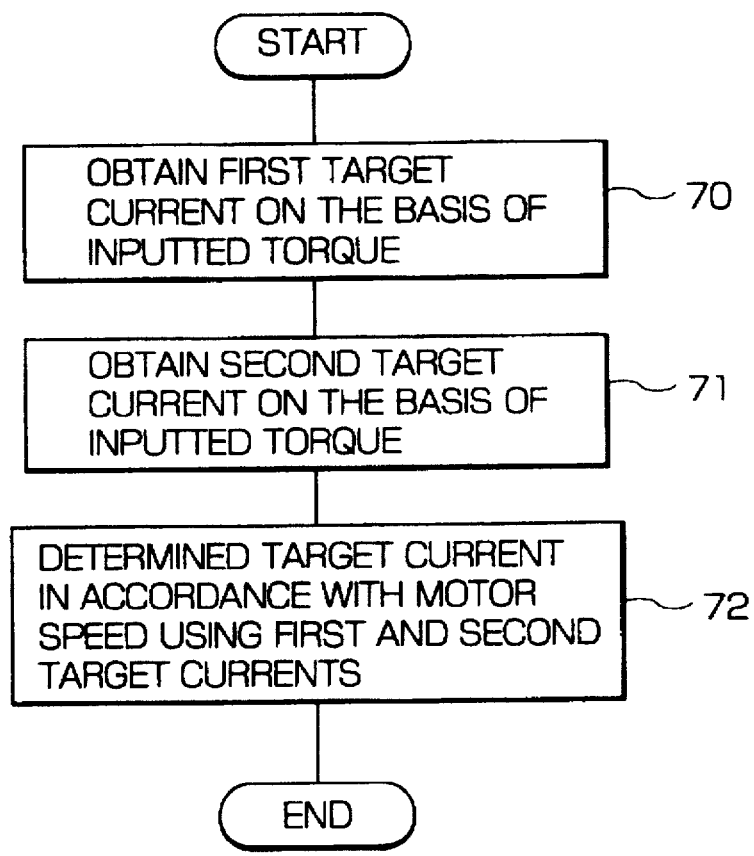
FIG. 15 is a flow chart useful for explaining the operation of a control system according to the seventh embodiment.

A seventh embodiment of this invention will be described hereinbelow with reference to FIGS. 14 and 15. FIG. 14 is an illustration of the relationship between a target motor current and a steering torque, and FIG. 15 is a flow chart showing the operation in this embodiment. A feature of this invention is that correction is made to decrease the output to the motor 10 obtained on the basis of the speed of the motor 10 in accordance with a map. The operation in this embodiment will be described in conjunction with the FIG. 14 characteristic illustration and FIG. 15 flow chart. First of all, a step 70 is executed to obtain a first target current IM1 on the basis of an inputted steering torque in accordance with a first characteristic map D as shown in FIG. 14.

Subsequently, a step 71 is implemented to obtain a second target current IM2 in accordance with a second characteristic map E as shown in FIG. 14. Following this step 771, a step 72 is implemented to obtain a target current IM by interpolating the first and second target currents with a motor speed VM. That is, that equation is as follows.

$$IM=IM1-(IM1-IM2) \times f(VM)$$

where f(VM) indicates a function of the motor speed VM and takes a positive value.

If f(VM) is more than zero but less than 1, the target current IM takes a value between IM1 and IM2. On the other hand, if f(VM) is not less than 1, the IM becomes below IM2 and, if necessary, can take a negative value (reverse rotation of the motor 10).

In the case of a conventional technique, when the steering speed of the steering wheel 1 increases, the inertia forces of the steering wheel 1 and the motor 10 also increase. For these reasons, when the steering wheel 1 is subjected to a quick handling (high steering speed), the response of the steering wheel 1 excessively lightens, thereby exerting adverse influence on feeling. Going the other way, according to this embodiment, the motor output value obtained from the steering torque is corrected in accordance with the speed of the motor 10 so that the motor output lowers when the motor speed is high, with the result that a good responsive sensation is obtainable during the steering operation of the steering wheel 1. In addition, since the current to the motor 10 is reduced even if the steering wheel is in the returning state, i.e., when the steering wheel rotates at a high speed, it is possible to suppress the overshoot amount from the neutral position of the steering wheel 1. As a result, the converging performance of the steering wheel 1 can improve.

Furthermore, even in the process in which the target current is determined on the basis of the phase-compensated value of the detection signal of the torque sensor 9, in the same way the phase compensation gain or the phase compensation operation coefficient can be got in accordance with the speed of the motor 10. It is also appropriate to limit the phase compensation output. Moreover, with this process being performed in the step 47 in FIGS. 2, 5, 8 and other figures, the converging performance and the responsive sensation of the steering wheel 1 are obtainable.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A control system for an electrically operated power steering apparatus, comprising:

steering torque detecting means for detecting a steering torque applied to a steering system;

a motor coupled to said steering system;

target current determining means for determining a target current to be supplied to said motor on the basis of an output of said steering torque detecting means;

a motor speed sensor;

phase compensating means for obtaining a phase compensation value on the basis of said output of said steering torque detecting means and rotational speed of said motor detected by said motor speed sensor;

correcting circuit for correcting said target current in accordance with said phase compensation value and outputting a corrected target current; and motor output means for driving said motor according to the corrected target current.

2. A control system as defined in claim 1, wherein said phase compensating means includes:

phase compensation calculating means for calculating said phase compensation value as a function of a variation of said output of said steering torque detecting means and a predetermined coefficient; and gain multiplication means for determining a torque compensation output by multiplying a gain factor, determined in accordance with said motor speed, by the phase compensation value, wherein said correcting circuit corrects said target current according to said torque compensation output.

3. A control system as defined in claim 2, wherein limitation is imposed on at least one of said gain factor and an output of said phase compensating means.

4. A control system as defined in claim 3, wherein a hysteresis is factored into the limitation.

5. A control system as defined in claim 2, wherein said gain factor takes on negative values.

6. A control system as defined in claim 1, further comprising a phase compensation output limiting means for limiting an output of said phase compensating means in accordance with said motor speed.

7. A control system as defined in claim 1, wherein said phase compensating means is composed of phase compensation calculating means for phase-compensating for said output of said steering torque detecting means as a function of an operation coefficient, and said phase compensating means determines said operation coefficient on the basis of said motor speed.

8. A control system as defined in claim 1, further comprising:

speed maintaining means for storing a maximum value of said motor speed when said motor speed exceeds a first decision value; and clearing means for clearing the maximum value of said motor speed stored in the speed maintaining means in response to the occurrence of at least one of said motor speed dropping below a second decision value smaller than said first decision value and the polarity of said motor speed reverses, the stored maximum value being used for control by said control system.

9. A control system as defined in claim 1, further comprising a subtraction circuit receiving the corrected target current, reducing the corrected target current by an amount corresponding to electric current of said motor, and providing a reduced target current to said motor output means, wherein said motor output means drives said motor according to the reduced target current.

* * * * *